8615X
J. Squier,
Crozing Staves.
Patented Jan. 21, 1835.
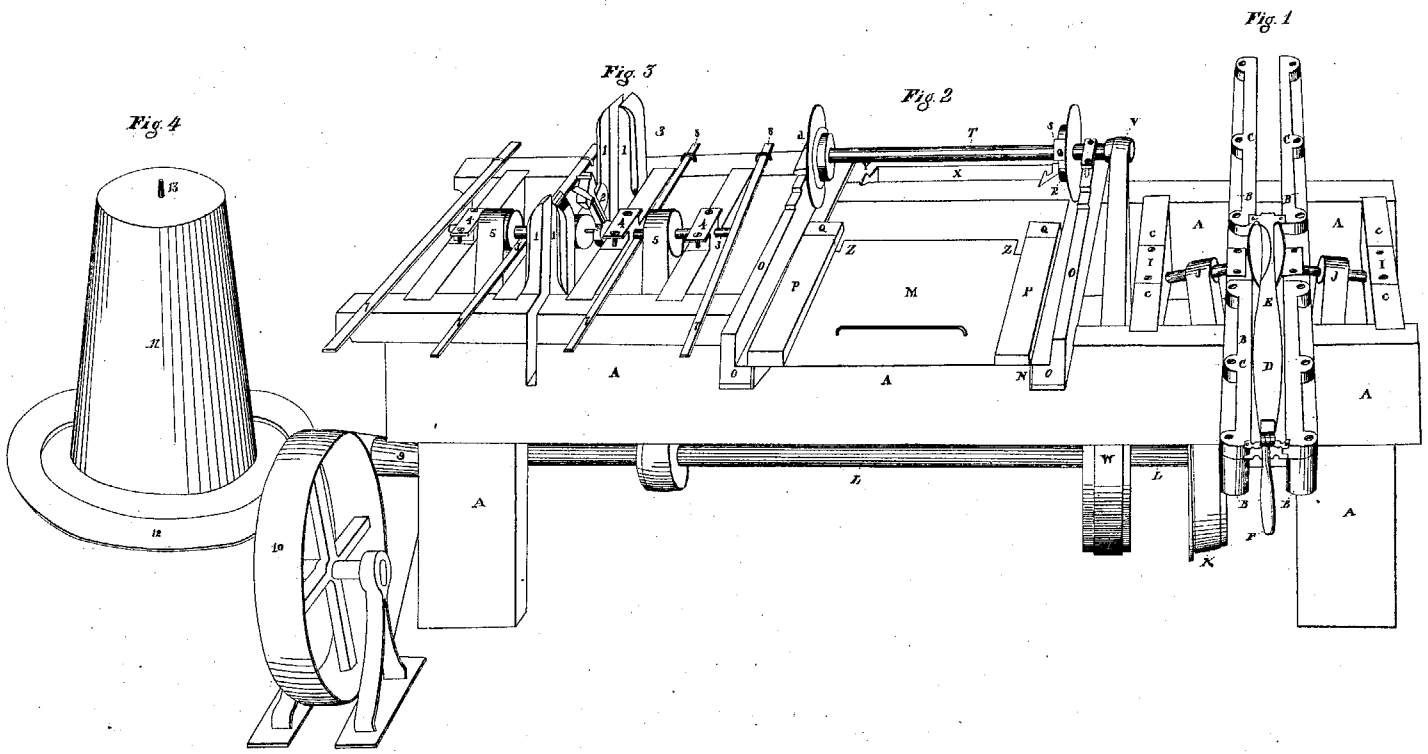
AM. PHOTO-LIT'HO. CO. N.Y. (OSBORNE'S PROCESS)

2384. Jan. 21. 1835 8615X 113.

John Squier
Letters Patent

The Schedule referred to in these Letters Patent, and making part of the same, containing a description in the Words of the said John Squier, himself, of his Improvement in a Machine called "Squiers Barrel Manufacture" for the purpose of manufacturing Barrels.

---

To all to whom these Presents may come. John Squier of Salina, in the County of Onondaga, and State of New York, sends greeting. Be it known that I, the said John Squier, have invented a new and useful Machine for the purpose of manufacturing barrels, called "Squier's Barrel manufacturer," and improvement in procuring staves for dry barrels, such as flour, salt, lime, and plaster barrels or other dry casks, which said Machine, and the manner of using it, and improvement, are as follows.

The machine is composed of four principal parts, the first three of which can be used and constructed either together or single, as is most convenient – the said first three parts are represented as connected on the Chart or Draught accompanying this specification, and which is lettered in reference to it – the said parts are numbered on said Chart in large figures 1, 2, 3, 4.

The part numbered 1, which stands on the right hand of the chart consists of a frame or support, four rails, four string pieces, two circular saws, three shafts or arbors, four drums, two bands, and two supports for the main shaft & the carriage. The parts marked on said chart A, represent the frame, being heavy pieces of timber, put together in a firm manner and supporting the machine. There are two string pieces, each six feet long, marked B, to which the rails hereafter mentioned, are screwed or nailed – these are of wood and firmly fastened to the frame of the Machine. The four rails marked C, are rails of iron, fastened to the string pieces, and are about two feet and a half long. They are made with a horizontal projection at the top, the projections

8615X being towards each other, so as with the top of the string pieces under them, to form a groove in which a corresponding projection in the carriage runs, to give firmness and steadiness of motion to the carriage; said rails are about three inches thick, and about five inches wide except at the points where they are fastened to the string pieces, where they are widened to eight inches.

The carriage marked D, is formed of a strong piece of wood, the top of which, for about three and a half feet between the point marked E, and the end towards the bottom of the chart, is curved like a stave, after it is set in a barrel— On the top of this wood is a plate of iron half an inch thick, and curved like the top of the wood. The carriage is about four feet long. The plate of iron upon the wood, along the space where it is curved, is formed & shaped like the staves of a barrel, being as much wider at the greatest point of elevation, than it is at the ends, as a stave is wider in the middle, than at the ends. At the extremities of the carriage there are wooden blocks faced with iron, marked [illegible], in the side of which are grooves fitting to the projections of the iron rails C, having projections at the bottoms of the blocks fitting the groove, between the string pieces & the rails, and also projections at the top running upon the rails.

At the point of the carriage marked E, there is a catch or notch of iron projecting toward the lower end of the carriage, as described on the chart, sufficiently large to receive one end of the stave, at the point of the carriage marked B, there is a swell or roll in which a groove is cut, to admit part of the [illegible] marked F, at the fulcrum. Through the roll lengthwise there is a hole or orifice to admit a pivot on which the lever F turns. The part marked F, is a simple lever, having its fulcrum at the point B, and terminating at the end nearest the point D, in a foot or plate about four inches square. The parts marked G, are two circular saws, about eight inches in diameter, so set as to form an angle with each other of as many degrees as 360 divided by the number of staves to be put in a barrel, would give. The angle formed by the planes of the saws, can be varied by means of screws at the ends of the arbors attached to them, directly under the points I. The parts marked H, are the arbors of iron connected with the saws G, and being at right angles to their planes; the ends nearest the saws passing through metallic boxes, and the other ends terminating in two other metallic boxes, about fifteen inches distant from the saws, at the point of the saws above mentioned. The parts J, are bands running upon the drums of the arbors H, and from them passing to two other drums upon the main shaft L, one of which is marked K, and the other of which cannot be represented on the chart, but is directly under the drum at the point marked J, and about five feet under it. The metallic boxes spoken of, are fastened at the points nearest the saws, to the string pieces marked B, and at the other end of the arbors, to the string pieces marked C. These last boxes may be set into string pieces, without being fastened thereto, and the angle of the saws may be varied by means of screws passing through the bottom of the string pieces C, and coming to the bottoms of the boxes so as to elevate or depress them at pleasure. The part marked L, is the main shaft to which the power is to be applied by means of two drums like those represented in that part of this No 3. and which are marked 9 and 10 - they being connected by means of a band, and the drum 10 being moved by a crank not visible in the chart. This drum can be moved either by a water wheel, horse power, or steam. The shaft marked L, and the drums therewith connected, can be under the floor of the room occupied by the machine. The power

8615X being applied to the machine, the boards to be cut into a stave, or as it is called, the straight or rough stave, is put with one end under the notch at the point E, the other end is bent over on the plate between E & the lever F, till it comes within the reach of the foot of the lever, when the lever is turned on the pivot at the point b, till the foot holds the stave firmly upon the carriage.

The whole carriage is then forced by hand, upon the rails C, and as the point E, passes between the saws, the end of the stave is brought into contact with the saws at a point where the distance between their planes is equal to the width of the stave at the end, and as the carriage passes on the plate of iron, being swelled or elevated at the centre gradually carries the stave to those points of the saw where their planes are more and more distant, until the middle of the stave passes the centre of the saws, when the reverse of the process above described, takes place; the stave passing down upon the arched plate, until the saws cut it at the other end, of the same width as at the first. The lever F being then thrown back, as represented in the chart the stave is taken to that part of the machine numbered 2. By this first process the edge of the stave is cut at a proper angle for fitting into a barrel.

The stave thus cut and placed is placed upon part No 2, which is composed of a frame similar to that of No. 1. A slide or carriage marked M, two rails on which the carriage runs marked O, faced with iron on the inside marked N; two circular saws marked U, a shaft connecting the saws marked T, two flanges on the inside of the saw marked R, two knives or cutters one only of which can be seen on the chart marked S, two metallic boxes at the end of the shaft T marked d. two crossing irons on the inside of the flanges marked e, one only of which is seen on the chart. one stick or block marked X; and two swinging catches marked Y, also two drums marked V. & W, connected by a band; and
a main shaft marked L, to which the power is applied, as des-
cribed in No1. Upon the slide M, there are two pieces of board
about an inch in thickness, fastened firmly by screws or nails
to the carriage plane N, and at the end nearest the wheel, cut
down to the thickness of half an inch for about six inches
from the end. The pieces of board are marked P, and the
parts where they are cut down Q. The width of the carriage
plane between & including the boards, is about four feet.
The plane is so constructed as to leave room between the
peices of wood P, and the wooden rails O, for the revolution
of the circular saws U. The object of this part of the machine
being to cut the staves of equal, and the right length, and
to champer & crose them; the stave to pass through the machine
is placed on those parts of the wooden pieces P, which are marked
Q. The carriage is then forced forced forward on the rails
O, faced with sheet iron on the sides N, and the circular
saws being hung at such a height as to revolve with the
lower edges below the under side of the stave, as it is laid
upon the points Q, cut the stave of the exact length required.
As the stave passes under the saws, it also comes in contact
with the crosing irons marked e, and with the champering
irons marked S. These irons & knives are fixed upon the
flanges R in the following manner. The flanges are of
iron about 2½ inches in thickness, about two inches of
which farthest from the saws are cylindrical, and the
remaining half inch passing to the planes of the saw at an
angle of about forty five degrees. The champering iron or
knife is about two inches in width, and is conformed as
to its shape and edge to the shape of the iron flange. The
edge of the knife projects over the perpendicular edge of
the flange about an inch – it is fastened to the circumference of the flange by having the iron of the flange cut down as deep as the thickness of the knife and then having screws confining it to the flange. The knife, as the stave passes cuts the upper side of each which is to be on the inside of the barrel to the same thickness, and that part of the knife which passes up to the saw at an angle of forty five degrees, cuts the end of the stave in the same fashion as staves are usually cut at the ends when put into the barrel, which is called champering. The crosing iron is a piece of iron having teeth like the teeth of a saw, about one inch wide, and fastened by means of screws to the perpendicular edge of the flange and at such distance from the saw as the crose is from the end of the stave. The iron projects as far beyond the circular edge of the flange as the crose is to be deep. As the stave is passing under the saws, the crosing iron cuts the crose in the stave. The swinging catches marked Y, are made to retain the stave, after it has passed under the saws, and has been champered and crosed. When the plate carrying the stave has been forced to a proper distance under the saws, the catches which are fastened on pivots to the ends of the block of wood marked X, pass into two spaces in the plane m, which are marked Z, and are about 4 inches deep, and when the carriage reaches the block X, they swing up behind the stave, and retain, as the carriage is drawn back, the next stave, forcing it off the block on the other side of the machine. The carriage is moved back and forth, by a handle at the point f.

Part No 3, is for the purpose of cutting the heads of barrels. It is composed of a frame similar ~~similar~~ to those already described, of four posts called guides, two on each side of the machine, and set at such a distance from each other as to admit a board edgewise, of the requisite thickness for making heads, said posts are marked 1, of two cutters marked 2, of two small shafts marked 3, and passing into the cutters at right angles to them — four metallic boxes through which the shafts 2 pass, marked 4, two bands marked 5, four drums, two of them seen under the bands, one at the point marked 6, and one not shown on the chart, four levers marked 7, held at one end by four staples marked 8, two drums marked 8&9, one of which is on the main shaft, and the other a large drum, which is represented in the model accompanying this specification, as turned with a crank, one band passing around drums 8&9, and the main shaft marked L.

X The dark wide line between the posts 1, is a space about two feet deep, and admits the board to be cut into heads — the cutters two are of iron about a foot and a half long, composed of two pieces, one of which is a plane piece of iron; the other piece is made to slide upon the first piece, having an incision in it, six or eight inches in length, through which a screw is fastened into the first piece, & can be screwed down upon the second piece, so as to hold it firmly to the first, at any point of the incision, so as to regulate the length of the cutter. The head of the cutter is on the second piece of iron. Its length is about six inches, and from the edge to the back part of the head, is about three inches, from the plane of the inside of the second piece or part of the cutter, there is a gradual projection of the iron, until it nearly reaches the top of the head, when the projection forms a thin sharp knife to cut the head thin at the edge, so as to fit in the crose of the stave. There are in the head two prominent points, which are also sharpened so as to cut deep into the board, when placed in the machine. The two ~~two~~ cutters are placed one in each side of the board.

8615X

The two shafts marked 3, are each about two feet long and pass directly through the metallic boxes, marked 4, and moveable in them. The shafts at the ends furthest from the cutters, pass beyond the cutters about four inches, and at the other ends terminate in pointed pins, about an inch and a half in length, and about an inch in dimeter, at the largest point; the drums on the shafts are about six inches in diameter. The drums on the shaft marked 1, are about eight inches in diameter. The levers 7 are about four feet long and held in staples 8, which are made so large, that the levers can be moved back and forth a sufficient distance to move the shafts 3, through the boxes 4. The levers about midway of their length meet the ends of the shafts The power being applied to the machine, a board of the proper thickness and width is put between the posts and carried thro' so far that the cutter in revolving, comes within the end of the board - the lever on the right hand is then forced to the left, and forcing the shaft through the boxes, brings the board into contact with the right hand cutter, which is screwed down at the proper length for cutting the head - The cutter then cuts about half way through the board, and the pin at the termination of the shaft, bores through the centre of the head. The second lever on the right hand is then forced to the right, and ceases to touch the board. The first lever on the left, or the one furthest from the cutter, is brought against the end of the shaft 3, and forcing the cutter against the board completes the cutting of the head, and the pin in the shaft completes the hole in the centre of the head. The second left hand lever is then forced to the left and the head cut and trimmed ready to be put into the barrel, drops upon the floor.

The principle is equally well adapted to a machine of any size, and with the assistance of three hands, this will make a hundred barrels per day - Most of the machine could be made of wood if necessary. The same principle could also be adapted to the manufacture of pails & cisterns by having a plane instead of an arched plate, as described in No 1, of this Specification.

Part No. 4, is designed to set up the barrels for hooping, & consists of a conical block, a little less in height than the height of a barrel marked 11; said block being a very little less in diameter than the head of a barrel. Around the bottom of the block is a ring of wood at a distance of six inches, or at such a distance, that a stave with one end placed against the ring, will bring the crose of the other end against the top of the block, the ring is marked 12. There is a pin in the centre of the block at the top, an inch and a half high, and about an inch in diameter, marked 13. The head of the barrel as taken from No 3, is placed upon the top of the block, with the hole in the centre, or the pin in the top. The edge of the head projects a little over the top. The staves are set around the block, with the foot against the ring 12, and the crose falls upon the edge of the head, when the proper number of staves is put into the ring, two hoops are put upon them, which confine the staves in their proper place. The barrel is then finished in the ordinary manner when taken off the block.

The improvement in procuring staves consists in sawing them out of slabs or other timber with circular saws, hung in the ordinary manner for slitting and cross cutting with sufficient size and power to slit stuff of that size, with guides of a length and width suited to that of which the staves are desired to be, saw the slab of the length of which you wish your stave to be, see letter A, then slit it into bolts of the width you wish your stave to have, see letter B, then slit the bolts of the thickness of the stave letter C. If sawn from other timber than slabs the log is to be first sawn into plank as wide as you want the staves. By the use of slabs for sawing staves, a large amount may be added to the capital of the Country, by the use of articles which have been thrown away hitherto, or considered useless.

8615X

The parts of the above machine can be moved by the same, or a different power, and may be used separately or together with good effect.

In witness whereof, I have hereunto subscribed my hand this sixth day of January 1835.

John Squier

Witnesses
William A. Cook
Henry Davis Jr.

Exd.
W.G.C.

Drawing (3800 words)

(Patented January 21. 1835)